2,920,093

BETA-(HYDROXYMETHYL)VINYL-BIS(TRI-METHYLSILOXY)METHYLSILANE

Donald L. Bailey, Snyder, N.Y., assignor to Union Carbide Corporation, a corporation of New York No Drawing. Application December 17, 1957
Serial No. 703,257

1 Claim. (Cl. 260—448.2)

This invention relates to a novel organosilicon compound. More particularly, the invention contemplates the provision of the specific organosilicon compound, beta - (hydroxymethyl) vinyl - bis(trimethylsiloxy) methylsilane, as represented by the following structural formula:

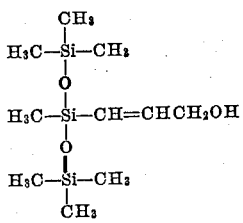

The invention is based on my discovery that the foregoing siloxane structure can be synthesized by the thermal addition of heptamethyltrisiloxane [$(Me_3SiO)_2Si(Me)H$] to propargyl alcohol [$CH{\equiv}CH_2OH$] in the presence of a platinum catalyst. In essence, the synthesis involves the formation of a reaction mixture comprising the heptamethyltrisiloxane, propargyl alcohol, and a small amount of a platinum catalyst, followed by heating of the reaction mixture to cause the components to react under influence of the platinum catalyst to effect decomposition of the silanic hydrogen bond and addition of the resulting silyl and hydrogen free radicals to respective carbon atoms of the carbon to carbon multiple bond of the acetylenic alcohol, with the production of the desired compound as an adduct of the component reactants.

The starting material heptamethyltrisiloxane employed in synthesizing the novel compound of the invention may be produced by any one of several conventional procedures. Thus, it can be produced, for example, by the sulfuric acid catalyzed rearrangement of methylhydrogenpolysiloxane [$(MeSiHO)_x$] with hexamethyldisiloxane [$Me_3SiOSiMe_3$] as an endblocker. This equilibration may be accomplished by simply stirring the reactants at room temperature (25° C.) for a period of from four to eight hours in the presence of from 0.5 to 1 percent by weight of sulfuric acid, followed by suitable known measures for effecting catalyst removal.

The platinum catalyst used in promoting addition of the heptamethyltrisiloxane to the unsaturated alcohol, is preferably employed in finely-divided form either alone, or in combination with an inert support such as charcoal, and the like, or in the form of a multi-component or heterogeneous catalyst consisting of platinum deposited on the gamma-allotrope of alumina (platinum-on-gamma-alumina).

It is found that the relative concentration of platinum employed for catalyzing the addition reaction is not overly critical, but rather, concentrations of the elemental metal ranging from 0.001 part to about 5 parts by weight of the reactants can be employed and satisfactory results are obtained. When the catalyst is employed in the form of a heterogeneous substance such as platinum-on-gamma-alumina, concentrations of the order of one to two percent by weight of the heterogeneous substance, containing one to two percent by weight of elemental platinum, function admirably for the purpose intended.

Generally, the reaction time and temperature of reaction are also relatively non-critical, and, in most cases, the reaction can be brought to completion with good yields of the desired adduct by heating the reactants at temperatures within the range 80–180° C. for periods ranging up to one day. In actual practice, I prefer to operate at reflux temperatures (114–119° C.) or slightly higher. It is relatively essential, however, to effect stirring or agitation of the reaction mixture throughout the time of treatment in order to establish and maintain uniform dispersion of the solid catalyst within the liquid reaction phase.

The compound of the invention possesses numerous desirable properties which render it useful for a wide variety of applications. Thus, by way of illustration, the vinyl group bonded to a silicon thereof, provides a reactive site for use in the preparation of various addition products. In addition, the compound may be blended or equilibrated with cyclic siloxanes by conventional means, to provide silicone oils containing polar hydroxyl groups and vinyl reactivity.

The presence of a polar group within the compound of the invention renders it extremely useful as a modifier for silicone oils as well as for thermosetting resins. Thus, the compound may be used to modify silicone oils by imparting greater lubricity, whereas it will contribute greater strength, greater cohesive and adhesive forces in bonding to other materials, greater solvent resistances, etc., to thermosetting resins and silicone elastomers.

The hydroxyl group of the compound may be used to introduce silicone functional groups into alkyd resins, polyurethanes, and similar systems in which the hydroxy group will react. The compound, per se, is useful as a silicone oil, and may be employed, also, to introduce the functional hydroxyl and vinyl groups into siloxanes in general.

It is believed that the invention may be best understood by reference to the following specific example describing the foregoing principles and procedures as applied to the production of the novel compound of my invention:

EXAMPLE

*Preparation of beta-(hydroxymethyl)vinyl-bis(trimethylsiloxy)methylsilane*
[$(Me_3SiO)_2Si(Me)CH{=}CHCH_2OH$]
*by addition of heptamethyltrisiloxane to propargyl alcohol*

Into a one-liter flash equipped with stirrer, condenser and thermometer there was charged 67 grams (0.3 mole) of $(Me_3SiO)_2SiMeH$ and 56 grams (1 mole) of $HC{\equiv}CCH_2OH$, together with 175 cubic centimeters of n-butyl ether to act as mutual solvent, and 1.1 grams of one percent platinum-on-gamma-alumina catalyst. Heating at reflux temperatures (114–119° C.) was maintained for twenty hours. The products were filtered, desolvated, and stripped. 84 Grams of volatile products and 6.5 grams of viscous residue was obtained. Fractionation of the products yielded 47.5 grams of the desired adduct (57 mole-percent yield). The compound yielded the following physical and analytical data:

Boiling Point _____ 74–78° C. at 1 mm.
Refractive Index ($n_D{}^{25}$) _____ 1.4210.

|  | Percent C | Percent Si | Percent H | Percent OH |
|---|---|---|---|---|
| Found | 42.8 | 29.0 | 9.3 | 6.5 |
| Theoretical | 43.0 | 30.1 | 9.3 | 6.1 |

Having thus described the subject matter of my invention, what it is desired to secure by Letters Patent is:

Beta - (hydroxymethyl)vinyl - bis(trimethylsiloxy)methylsilane.

References Cited in the file of this patent

UNITED STATES PATENTS 2,823,218    Speier et al   ------------ Feb. 11, 1958

FOREIGN PATENTS 769,497    Great Britain ------------ Mar. 6, 1957